United States Patent [19]

Nanbu et al.

[11] Patent Number: 4,798,354
[45] Date of Patent: Jan. 17, 1989

[54] FISHING REEL WITH WEAR-RESISTANT LINE GUIDE

[75] Inventors: Kazuya Nanbu; Nobuyuki Yamaguchi; Kaoru Masubuchi, all of Tokyo, Japan

[73] Assignee: Daiwa Seiko, Inc., Tokyo, Japan

[21] Appl. No.: 943,256

[22] Filed: Dec. 17, 1986

[30] Foreign Application Priority Data

Dec. 20, 1985 [JP] Japan .................. 60-196286[U]
Oct. 29, 1986 [JP] Japan .................. 61-166043[U]

[51] Int. Cl.$^4$ ............................................ A01K 89/04
[52] U.S. Cl. ............................................ 242/84.1 R
[58] Field of Search ....................... 242/84.1 R, 157 R

[56] References Cited

U.S. PATENT DOCUMENTS

| | | | |
|---|---|---|---|
| 1,494,933 | 5/1924 | Schuster | 242/84.1 R |
| 1,869,441 | 8/1932 | Shakespeare, Jr. | 242/84.1 R |
| 2,209,166 | 7/1940 | McArthur | 242/84.1 R |
| 3,145,947 | 8/1964 | Stanley | 242/157 R X |
| 3,974,977 | 8/1976 | Kamikawa | 242/84.1 R |
| 4,638,958 | 1/1987 | Furomoto | 242/84.1 R |

FOREIGN PATENT DOCUMENTS 59-15894  5/1984  Japan .
18726  of 1904  United Kingdom ........... 242/84.1 R Primary Examiner—John M. Jillions
Attorney, Agent, or Firm—Kalish & Gilster

[57] ABSTRACT

A double bearing type fishing reel which comprises a frame body having opposed side frames and with a plurality of support extending between the side frames is provided. The frame body with the side frames and the supports are integrally constructed of a synthetic resin. A line-carrying spool extends between the side frames spacedly from the supports and is attached to axial rotation. There is mounted on the upper surface of at least a support on the line spinning side of the frame body a hard wear-resistant member which thus is disposed between the associated support and the line for protecting the engaged support from the development of scratches, grooves or other marring thereon by reason of the frictional heat which is normally produced by contact of the line with the support. The hard wear-resistant member may be of a multiplicity of configurations and may be mounted for either fixed disposition or for rotation.

4 Claims, 3 Drawing Sheets

FISHING REEL WITH WEAR-RESISTANT LINE GUIDE

BACKGROUND AND SUMMARY OF THE INVENTION

The present invention relates in general to fishing reels, and, more particularly, to an improvement in a double bearing type fishing reel having a frame body of a synthetic resin which integrally includes both side frames and a plurality of interconnecting supports.

Recently, both side frames and a plurality of interconnecting supports for a double bearing type fishing reel are integrally constructed of a synthetic resin in order to lighten weight, to prevent from rusting, or to facilitate assembly (see, for example, Japanese Patent Laid-Open No. 15894/1984). However, in frame bodies constructed of a synthetic resin and which is integrally composed as described above, if a line is strongly rubbed against the ridge portion of a synthetic resin support forwardly of the spool or another suppor when tension is applied to the line at the time of spinning the line from the reel, due to a backlash phenomenon, or upon winding the line, frictional heat is produced and the line is likely to cut into the contacted support and thereby cause the development of a groove in, or otherwise damage, such support. Once a groove is formed, the line will on all like future occasions tend to enter the groove, so that the latter becomes succesively deeper and when the line is spun, not only is frictional resistance which adversely offsets the fishing operation applied to the line being spun, but also the line is easily damaged, ultimately resulting in severance of the line. Furthermore, the presence of a multiplicity of grooves or scratches disadvantageously impairs the external esthetic appearance of the reel.

Accordingly, it is an object of the present invention to provide a double bearing type fishing reel of the character above stated which is adapted to protect the upper surface of at least the support on the line spinning side by the provision of a hard wear-resistant member, thereby preventing contact between the line and support from causing grooving or damaging the support as well as preventing the frictional resistance between the line and the support from increasing.

It is another object of the present invention to provide a protective member on at least the reel support on the line spinning side which is so configured for effective coordination with the particular support regardless of the specific character thereof.

It is another object of the present invention to provide a reel support protective member which is attached for optionally fixed or removable engagement upon the associated reel.

It is another object of the present invention to provide a protective member for a reel support which may be easily mounted upon existing reels without necessity of costly installation or untoward deformation of the reel body.

It is a still further object of the present invention to provide a wear-resistant member of the character stated which may be most economically manufactured; which may be easily secured in operative position; and which markedly enhances the effective life of the reel. Furthermore, such members may be mounted in a multiplicity of manners, demonstrating a marked versatility for operative disposition.

To achieve the aim of the present invention, a double bearing type fishing reel according to the present invention is provided with a hard wear-resistant member on the upper surface of at least the support on the line spinning side of a frame body of a synthetic resin which is integrally composed of both side frames and a plurality of supports.

In the present invention, since a hard wear-resistant member is provided on the upper surface of at least the support on the line spinning side of a frame body of a synthetic resin, if the line is strongly rubbed against the ridge portion of a synthetic resin support in the forward portion of the spool when tension is applied to the line at the time of spinning the line from the reel, due to a backlash phenomenon, or at the time of winding the line, frictional heat is produced by the contact between the hard wear-resistant member and the line, but no scratching, marring, or other destruction is formed on the hard wear-resistant material. Therefore the frictional resistance applied on the line does not increase, thereby preventing the line from snapping or severing.

DESCRIPTION OF THE PRACTICAL EMBODIMENTS

Figure 1:
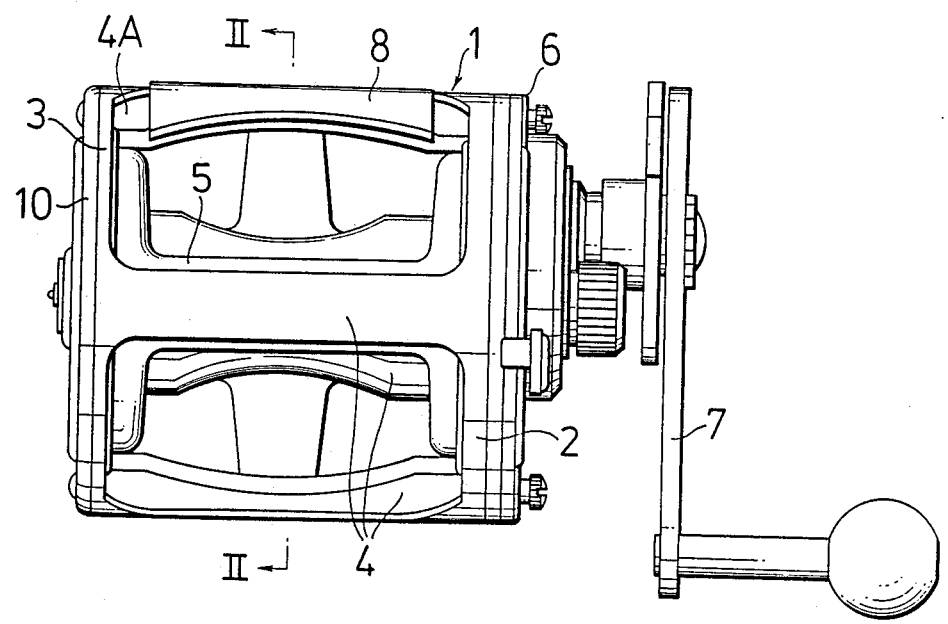
FIG. 1 is a plan view of a first embodiment of a double bearing type fishing reel constructed in accordance with and embodying the present invention.
Figure 2:
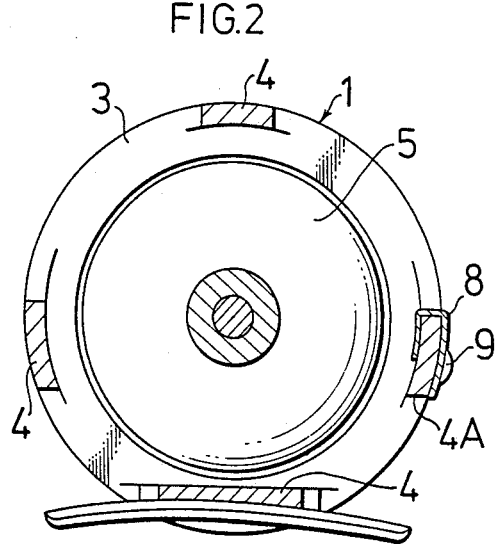
FIG. 2 is a vertical transverse sectional view taken on the line II—II of FIG. 1.

Referring now by reference characters to the drawings which illustrate practical emodiments of the present invention, 1 indicates a frame body of a fishing reel of the double bearing type constructed of synthetic resin which body integrally comprises both inner side frames 2, 3 and a plurality of supports 4 which connect the same. A spool 5 is rotatably disposed between side frames 2, 3, and is rotated by a handle 7 through suitable drive (not shown) housed in an outer side plate 6.

On the ridge portion of the upper surface of the support 4A on the line spinning side, among the plurality of supports 4, there is mounted a U-shaped hard wear-resistant member 8 which extends between side frames 2, 3, lengthwise substantially coextensive with the winding extent of spool 5; said member 8 being fixed as by screws 9.

An outer side plate 10 is fixed, corresponding to side plate 6, on the outer side of side frame 3 by screws.

The operation of this embodiment having the above-described structure will now be explained.

When the line with the tension applied thereto is spun from spool 5, with a backlash phenomenon being produced; or when the line is wound, the line, in traveling, will rub against hard wear-resistant member 8, causing frictional heat to be produced on the latter. However, since member 8 is made of a material which is resistant to being scratched, or grooved, or otherwise marred, by the friction developed from contact with the line, no scratch or groove is produced thereon so that the frictional resistance applied to the line does not increase. As a result, there is no inadvertant breakage or severance of the line nor tarnishing of the esthetic appearance of the reel.

Figure 3:
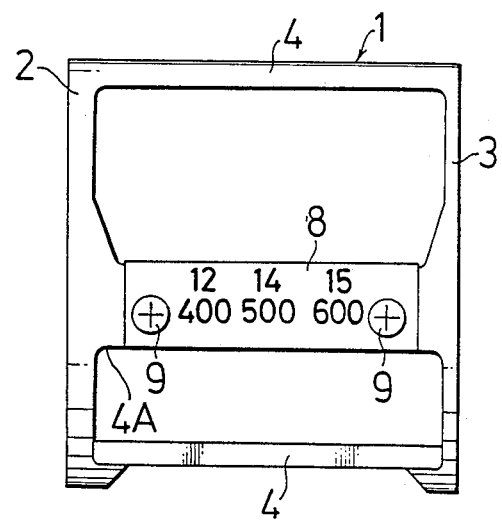
FIG. 3 is a front elevational view of the main body portion of the reel shown in FIG. 1.

In this above-described first embodiment, a plate as shown in FIG. 3, on which the thickness and the length of the line is inscribed is attached as by said screws 9, to the forward face of the member 8.

Figure 4:
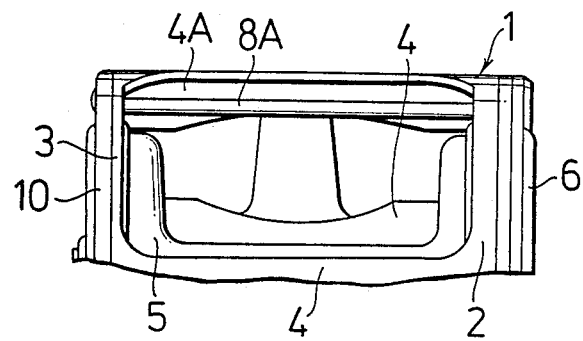
FIG. 4 is a fragmentary plan view of the main body portion of a second embodiment of a double bearing type fishing reel constructed in accordance with and embodying the present invention.
Figure 5:
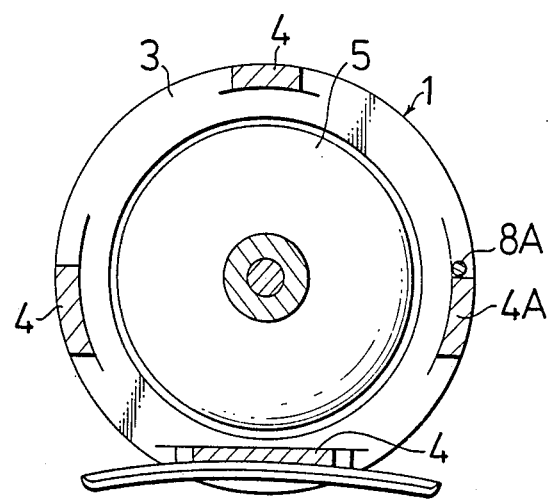
FIG. 5 is a transverse vertical sectional view of the embodiment shown in FIG. 4.

In FIGS. 4 and 5 which illustrate a second embodiment of the present invention, a rod-like wear-resistant member 8A is provided on the inner ridge portion of the upper surface of a support 4A on the line spinning side, and extends between side frames 2, 3. Member 8A is suitably maintained in position as by bolting at at least one end thereof to frame body 1 or is integral therewith as by insert molding.

In this second embodiment, since the line with tension applied thereto slides on the member 8A, it does not come into direct contact with the ridge portion of the associated support 4A. Therefore, there is no danger of producing any scratches, grooves, or the like on support 4A. Although outer side plate 10 is indicated as being optionally bolted outside side frame 3, in this second embodiment, side frame 3 and outer side plate 10 may be integrally constructed.

Figure 6:
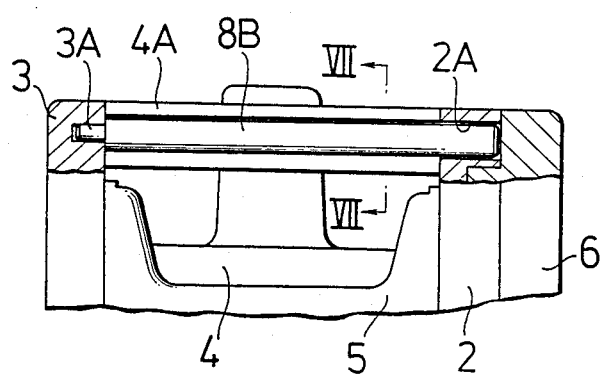
FIG. 6 is a fragmentary plan view of the main body portion of a third embodiment of a double bearing type fishing reel constructed in accordance with and embodying the present invention.
Figure 7:
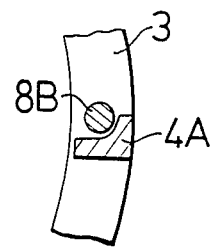
FIG. 7 is a fragmentary transverse vertical sectional view of the embodiment shown in FIG. 6.

FIGS. 6 and 7 which illustrate a third embodiment of the present invention, a rod-like hard wear-resistant member 8B is rotatably supported by the upper surface of a support 4A on the line spinning side of frame body for extension between side frames 2, 3.

In this third embodiment, when the line with tension applied thereto, as when the line is spun, travels across hard wear-resistant member 8B, which is caused to rotate with the movement of the line, thereby preventing unnecessary external force from being applied to the line. In addition, since support 4A is protected by member 8B, there is no danger of damaging or grooving support 4A.

As shown in FIG. 7, the diameter of member 8B is larger than the corresponding dimension of support 4A, so that even when the line with the tension applied thereon travels across member 8B, the ridge portion or normally line-contacting of support 4B is protected from contact with the line. Therefore, even if member 8B is provided on the central portion of the surface of support 4A, there is no danger of destructive contact between the line and said support.

Figure 8:
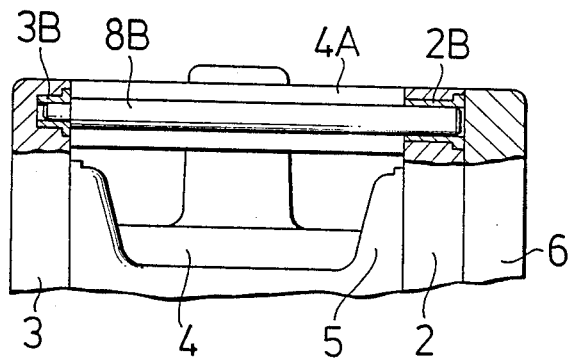
FIG. 8 is a fragmentary plan view of the main body portion of a modification of the third embodiment shown in FIG. 6.

Referring now to FIG. 8 which illustrates a modification of the embodiment (third) shown in FIGS. 6 and 7, bearings 2B and 3B are provided on side frames 2, 3, respectively, for journalling of member 8B in order to cause the rotation thereof to be increasedly smooth.

In each of the above-described embodiments, the hard wear-resistant member 8, 8A or 8B, as the case may be, is provided on support 4A on the line spinning side, but each may be on another support 4, and such members 8, 8A or 8B may have any suitable given configuration.

In each of the embodiments of FIGS. 6–8, rod 8B is receivable through the through-holes 2A or 2B respectively in side frame 2, the other end of the rod being receivable by the blind aperature 3A or 3B respectively in side frame 3. Side frame 6 keeps rod 8B from coming out through such through-hole.

The means for fixing member 8, 8A, or 8B in operative position is not limited to those shown in above described, but may, if desired, be retained as by means of an adhesive, or by plating, or the like.

As shown above, a hard wear-resistant member is provided to prevent the line from producing a scratch, a groove, or the like, on at least the support on the line spinning side due to the frictional heat produced by rubbing of the tensioned line against the support. It is clear from the foregoing description that if the har wear-resistant member is planar, it is provided on the ridge portion of the upper surface of the support on the line spinning side with which the tensioned line is most likely to come into contact. If the hard wear-resistant member is adapted to intervene between the tensioned line, obstructing contact therebetween and the ridge portion of the support, as in the case of a rod-like wear-resistant member, it may be disposed at a desired preselected position so long as it prevents the line from coming into contact with the support.

The present invention thus produces the following excellent effects:

Even if frictional heat is produced when the line rubs against the hard wear-resistant member caused by the tension applied to the line at the time of spinning the line from the reel, due to a backlash phenomenon, or at the time of winding the line, no scratch or groove is produced on the hard wear-resistant member, and hence the frictional resistance applied to the line does not increase, thereby preventing the breaking or severing of the line and the external appearance of the reel is not in anyway impaired.

What is claimed is:

1. A double bearing tupe fishing reel comprising a frame body having first and second spaced apart, opposed side frames, a plurality of supports extending between said first and second side frames, said frame body, side frames, and supports being integrally constructed of a synthetic resin, there being a line-carrying spool extending between said side plates for axial rotation, a line provided on said spool for winding and unwinding movement thereabout, at least one of said supports being positioned for normal travel thereacross of said line during winding and unwinding movement, a hard wear-resistant member operatively associated with said at least one support, said wear-resinstant member extending between said first and second side frames, means engaging said wear-resistant member at the opposite ends thereof to said first and second side frames, said wear-resistant member being a rod over which said line travels, said rod extending between said side frames and presenting for exposure to said line between said side frames a constant diameter, said diameter preventing said line when tensioned from coming into contact with said at least one of said supports, the rod being rotatably jornalled at opposite ends in said side frames, the rod thereby protecting the adjacent said at least one of said supports from wear-damaging engagement with said line, the reel including an outer side plate extending externally across one of said side frames, said one of the side frames being apertured by a through-hole for receiving a corresponding first end of the rod, the other end of the rod being received by a blind aperture, the outer side plate extending across and covering the through-hole, whereby the outer side plate keeps the rod from coming out through the through-hole.

2. A double-bearing type fishing reel according to claim 1 wherein said at least one support is provided with a ridge portion in the upper surface thereof, and fastener elements engaging said wear-resistant member to said ridge portion.

3. A double-bearing type fishing reel according to claim 1 wherein said at least one support, is provided with a ridge portion in the upper surface thereof, said wear-resistant rod being located immediately spacedly adjacently said ridge portion.

4. A double-bearing type fishing reel according to claim 1 wherein bearing means are respectively carried within the through-hole and blind aperture for bearing journalling for rotation of the opposite ends of said wear-resistant rod within said first and second frames.

* * * * *

UNITED STATES PATENT AND TRADEMARK OFFICE
CERTIFICATE OF CORRECTION

PATENT NO. : 4,798,354

DATED : Jan. 17, 1989

INVENTOR(S) : Kazuya Nambu et al

It is certified that error appears in the above-identified patent and that said Letters Patent is hereby corrected as shown below:

Col. 4, line 40, delete "tupe" and insert --type--.

Col. 4, line 62, delete "jornalled" and insert --journalled--.

Col. 6, line 2, delete the comma after "support".

Col. 6, line 5, delete "adjacently" and insert --adjacent--.

Signed and Sealed this

Nineteenth Day of November, 1991

*Attest:*

HARRY F. MANBECK, JR.

*Attesting Officer*     *Commissioner of Patents and Trademarks*